United States Patent
McGrane et al.

(10) Patent No.: US 10,712,048 B2
(45) Date of Patent: Jul. 14, 2020

(54) MOLTEN SALT CENTRAL RECEIVER ARRANGEMENT AND OPERATING METHOD

(71) Applicant: General Electric Technology GmbH, Baden (CH)

(72) Inventors: John David McGrane, Longmeadow, MA (US); Pedro Israel Inigo, South Windsor, CT (US); Apurba Kumar Das, South Windsor, CT (US); Rahul Jayant Terdalkar, Heathrow, FL (US); Abhinaya Joshi, Glastonbury, CT (US); Michael M. Clark, Corning, NY (US); Joseph W. Quinn, Bloomfield, CT (US); Gary Pashko, Ludlow, MA (US); Robert Derosa, Tolland, CT (US)

(73) Assignee: General Electric Technology GmbH, Baden (CH)

( * ) Notice: Subject to any disclaimer, the term of this patent is extended or adjusted under 35 U.S.C. 154(b) by 201 days.

(21) Appl. No.: 15/907,896

(22) Filed: Feb. 28, 2018

(65) Prior Publication Data

US 2019/0264951 A1 Aug. 29, 2019

(51) Int. Cl.
*F22B 1/00* (2006.01)
*F24S 40/60* (2018.01)
(Continued)

(52) U.S. Cl.
CPC ............. *F24S 40/60* (2018.05); *F24S 10/742* (2018.05); *F24S 20/20* (2018.05); *F24S 23/70* (2018.05);
(Continued)

(58) Field of Classification Search
CPC ....................................................... F24S 40/60
(Continued)

(56) References Cited

U.S. PATENT DOCUMENTS

| 4,308,912 A * | 1/1982 | Knecht | ................. C08F 257/02 |
|---|---|---|---|
| | | | 126/585 |
| 2008/0289793 A1* | 11/2008 | Geiken | ................... F28D 20/00 |
| | | | 165/10 |

(Continued)

OTHER PUBLICATIONS

Das, A.K, et al. "Design features and control concepts of ALSTOM molten salt receiver," International Conference on Concentrating Solar Power and Chemical Energy Systems, SolarPACES 2014, Energy Procedia 69, vol. 69, pp. 350-359 (May 2015).

*Primary Examiner* — Avinash A Savani
(74) *Attorney, Agent, or Firm* — Dority & Manning, P.A.

(57) ABSTRACT

A molten salt central receiver arrangement for transferring heat from panels to a molten salt that flows through the panels. A control device allows to change the condition of at least one of the panel arrangements of the molten salt central receiver arrangement depending on at least an operating parameter of at least one panel and/or depending on an environment signal that characterizes the actual or forecast available heat for the heat transfer to the molten salt. In normal operation passes, each having one or more panels, are connected in series such that molten salt flows in a serpentine or alternating way upward and downward through subsequent passes. In a parallel flow condition, molten salt may flow upward through all of the panels in parallel. In a drain condition, the molten salt is forced out of one or more panels and replaced by compressed air.

14 Claims, 4 Drawing Sheets

(51) Int. Cl.
    *F24S 20/20*     (2018.01)
    *F24S 23/70*     (2018.01)
    *F24S 10/70*     (2018.01)
    *F24S 40/70*     (2018.01)
    *F28F 9/013*     (2006.01)

(52) U.S. Cl.
    CPC ............... *F24S 40/70* (2018.05); *F22B 1/006* (2013.01); *F28F 9/013* (2013.01)

(58) Field of Classification Search
    USPC .......................................................... 126/640
    See application file for complete search history.

(56) References Cited

U.S. PATENT DOCUMENTS

| | | | | |
|---|---|---|---|---|
| 2013/0219888 A1* | 8/2013 | Yang | ................... | F01K 7/22 60/641.8 |
| 2015/0128931 A1* | 5/2015 | Joshi | ................... | F01K 3/12 126/714 |

\* cited by examiner

MOLTEN SALT CENTRAL RECEIVER ARRANGEMENT AND OPERATING METHOD

BACKGROUND

This invention refers to a molten salt central receiver arrangement and a method for operating the molten salt central receiver arrangement.

The basic design and function of a molten salt central receiver arrangement is described in A. K. Das et al. "*Design features and control concepts of ALSTOM molten salt receiver*", International Conference on Concentrating Solar Power and Chemical Energy Systems, SolarPACES 2014, Energy Procedia 69 (2015), 350-359 available online at www.sciencedirect.com.

The molten salt central receiver arrangement contains a panel arrangement with multiple panels having tubes, through which molten salt may flow. Solar radiation is reflected by solar reflectors onto the panels. In so doing heat is transferred from the panel arrangement to the molten salt. The heated molten salt can be stored in a hot tank. The thermal energy of the molten salt can be used to generate steam and to drive a steam turbine to produce electric energy.

The problem with the molten salt is that it may freeze, if its temperature drops below a critical temperature value due to insufficient heating by means of the central receiver arrangement. To avoid freezing of the molten salt A. K. Das et al. propose to feed pressurized air into the panels in order to drain the molten salt from the panels and to fill the tubes of the panels with compressed air instead. The compressed air flows from an upper manifold and down through the panels of the panel arrangement to a lower manifold.

Draining of the panel arrangement is a critical operation. If draining is not achieved before the molten salt temperature drops to a critical value, one of the panels might be blocked due to freezing of the molten salt. Thus, the restart of the molten salt central receiver arrangement is time consuming, because the tubes of the panels have to be refilled with molten salt first, before the panels can be heated. Without a flow of molten salt through the panel tubes the heat of the panels cannot be transferred and the panels might be damaged. Consequently, the reliability and availability of the system is reduced when the panels are not properly drained.

SUMMARY

It is thus an object of the present invention to avoid at least one of the drawbacks mentioned above and to provide an improved molten salt central receiver arrangement. Particularly the danger that molten salt freezes within a panel shall be further reduced and/or the efficiency of the molten salt central receiver arrangement shall be increased.

This object is solved by means of a molten salt central receiver arrangement and a method for operating the molten salt central receiver arrangement described herein.

The molten salt central receiver arrangement comprises a panel arrangement with several panels. Each panel is preferably fluidically connected between an upper manifold and a lower manifold. Directly adjacent panels may be connected to one common upper or lower manifold.

An inlet tank for providing molten salt to the panel arrangement and an outlet tank for receiving molten salt from the panel arrangement may be provided. The inlet tank is preferably fluidically connectable with a first upper manifold by means of a feed line. The outlet tank may be fluidically connectable with a last manifold of the upper and lower manifolds by means of a supply line.

A vent line may be fluidically connectable with the outlet tank. Each upper manifold is preferably fluidically connectable with the vent line by means of an upper branch line, wherein a controllable upper branch valve may be disposed in each upper branch line. Additionally, a drain line may be fluidically connectable with the feed line. Each lower manifold may be fluidically connectable with the drain line by means of a lower branch line, wherein a controllable lower branch valve is disposed in each lower branch line.

The molten salt central receiver arrangement also preferably comprises a compressed air source preferably fluidically connectable with the vent line by means of a controllable air valve.

A control device is provided that is preferably adapted to control the valves, particularly the upper and lower branch valves and the air valve depending at least on an operating condition of one or more panels. The control device may be adapted to drain at least one of the panels in a draining condition and/or may be adapted to create a parallel flow of molten salt through the panels in a parallel flow condition.

During the draining condition at least one of the panels may be drained individually. Alternatively, during the draining condition two or more or all of the panels may be drained in an order that is determined depending at least on the operating condition of one or more panels. For draining a respective panel, compressed air is provided to the upper manifold to which the at least one panel is connected that is to be drained.

During the parallel flow condition molten salt may flow from the lower manifolds through all of the panels to the upper manifolds. The molten salt may be directed from the upper manifolds to the outlet tank via the vent line. The parallel flow condition can be achieved by controlling and particularly opening the upper and lower branch valves.

If insufficient heat is provided to the panel arrangement, the control device may control the valves to switch to the draining condition. In the draining condition the panels are not drained in one predetermined sequence. Rather the panels may be drained individually or in an order that depends on the operating condition of one or more of the panels, particularly the panel temperature of one or more of the panels. Therefore, the panel that is subject to the highest risk of freezing of the molten salt, may be drained first. This reduces the danger that the molten salt freezes inside one of the panels and blocks the respective panel.

The control device is alternatively or additionally adapted to create a parallel flow of molten salt through all of the panels. In this parallel flow condition the panels are not drained by means of compressed air. Rather the molten salt is flowing in a single pass through the panel arrangement. This means a flow of molten salt does not pass through two or more of the manifolds successively, but only flows from a lower manifold through one single panel to an upper manifold. In so doing the temperature loss of the molten salt flowing through the panel arrangement is limited and the temperature of the molten salt can be maintained above a lower critical value at least for a certain period of time. This parallel flow condition is particularly suitable, if the reduced heating of the panel arrangement occurs for a limited period of time only. Such a situation may occur, if solar radiation is used to heat the panels and the solar radiation is blocked by clouds for a limited period of time only. In such a situation it is advantageous to keep the molten salt flowing through the manifolds and panels. This remarkably speeds up the re-start of the molten salt central receiver arrangement after sufficient heat is again available to heat-up the panel arrangement and thus the molten salt flowing therethrough. Consequently, the total efficiency of the molten salt central receiver arrangement is increased.

In one embodiment the control device is adapted to provide the drain condition and the parallel flow condition selectively, depending on an evaluation of the operating condition of one or more panels. If it is expected that the heating of the panel arrangement is insufficient over a longer period, the control device may switch from a normal operating condition to the draining condition. If it is determined that insufficient heating of the panel arrangement is only present for a time period that does not exceed a time period threshold, the control device may switch from a normal operating condition to the parallel flow condition.

It is advantageous, if the control device is adapted to open the upper branch valves and the lower branch valves to create the parallel flow of molten salt during the parallel flow condition. During the parallel flow condition, at least the air valve and particularly additional valves like one of feed line valves in a feed line to the first upper manifold and a supply line valve in the supply line are maintained in a blocking or closed state.

Preferably the control device is adapted to drain the at least one panel by forcing the molten salt out of the at least one panel by means of the pressure of the compressed air. During the draining condition the at least one feed line valve and the supply line valve are in closed state whereas the air valve is in an open or connecting state such that air from the compressed air source may be provided to the panels via the vent line and the upper branch lines. Depending on the at least one panel to be drained and/or the order of draining the panels, the at least one upper branch valve is opened or the upper branch valves are opened in the respective order to allow the compressed air to enter the associated panel or panels. The molten salt is forced into the associated lower manifold and may flow through the lower branch line into the drain line if the respective lower branch valve or valves is/are opened by the control device.

In one embodiment at least one temperature determination means or temperature sensor is provided that is adapted to determine an actual panel temperature of at least one of the panels. Preferably a temperature determination means is assigned to each of the panels. The temperature determination means may be realized as thermo-coupler or the like that can be attached to one or more tubes of one panel. The temperature determination means is preferably adapted to measure the temperature of at least one tube of a respective panel. Temperature determination may be based on measurements in the upper or lower manifold.

It can be advantageous that the control device is adapted to drain at least one of the panels and/or to create the parallel flow of molten salt depending at least on the at least one panel temperature. The at least one panel temperature may be used as parameter for characterizing the operating condition of the respective panel. It is thus possible to drain those panels first that have the lowest panel temperature. It is additionally or alternatively possible to drain those panels last that have the highest panel temperature. Particularly, it is possible to drain the panels in the order of the panel temperatures beginning with the panel having the lowest panel temperature.

It is advantageous, if the control device is further adapted to switch to the drain condition or the parallel flow condition depending at least on an environment signal. The environment signal characterizes a heating power provided to the panels, particularly the actual and/or forecast heating power. The heating power may depend on the solar radiation. The environment signal can be based on an operator input and/or based on a determined and/or forecast weather condition, particularly the solar radiation.

In one embodiment the inlet tank is a pressure tank. The molten salt contained in the inlet tank is put under pressure such that the molten salt may be forced from the inlet tank via the feed line to the panel arrangement and through the panel arrangement. The pressure of the inlet tank can be created by means of the pressure of the compressed air provided by the compressed air source of the molten salt central receiver arrangement.

Embodiments of the molten salt central receiver arrangement and of an operating method of the molten salt central receiver arrangement are contained in the dependent claims, the description and the drawings. In the subsequent detailed description, embodiments of the invention are explained in detail with reference to the drawings. In the drawings:

DETAILED DESCRIPTION

Figure 1:
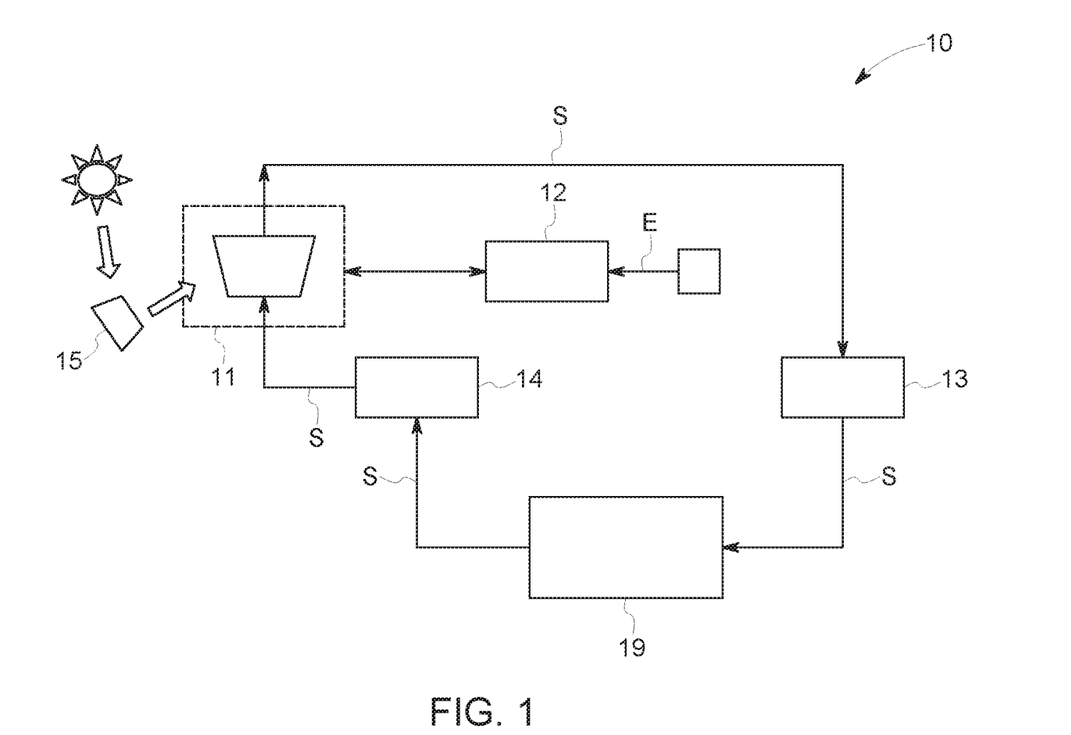
FIG. 1 is a block diagram of a molten salt solar thermal power plant.

The block diagram of FIG. 1 shows an embodiment of a molten salt solar thermal power plant 10 comprising a molten salt central receiver arrangement 11 (FIGS. 2-4) that is communicatively coupled with a control device 12. The molten salt central receiver arrangement 11 is fluidically connected with a hot tank 13 and a cold tank 14. A solar field 15 may be provided to reflect and direct solar radiation onto a panel arrangement 16 with multiple panels 17 of the molten salt central receiver arrangement 11. The solar radiation is used to heat tubes 18 of one or more panels 17. Molten salt S may flow through the tubes 18 of the panel 17 thereby transferring heat from the tubes 18 to the molten salt S. The heated molten salt S flows to the hot tank 13. From the hot tank the heated molten salt is provided to a power generating device 19 that converts thermal energy of the heated molten salt S in mechanical and/or electrical energy, e.g., in steam that drives a steam turbine. The mechanical energy of the steam turbine may be converted into electrical energy or may be used to drive any other load.

The molten salt that exits the power generating device 19 is forwarded to the cold tank 14. From the cold tank 14 the cooled molten salt can be supplied again to the molten salt central receiver arrangement 11 in order to re-heat the molten salt. Thus, the power plant 10 is adapted to circulate molten salt for heating the molten salt and for extracting heat from the molten salt successively, wherein the extracted heat can be converted into mechanical and/or electrical energy. In this present example the heating of the molten salt is achieved by using solar energy.

The control device 12 may receive sensor signals and/or input signals from an operator or from another device. This data may be used to control the molten salt central receiver arrangement 11. The control device 12 may also be used to control other parts or components of the molten salt solar thermal power plant 10, e.g., the solar panels of the solar field 15. In the illustrated embodiment the control device 12 receives an environment signal E from a suitable device or an operator. The environment signal E characterizes the actual and/or forecast solar radiation provided to the solar field 15. Thus, the environment signal E may be characteristic for the present or forecast heat power provided to the panel arrangement 16 of the molten salt central receiver arrangement 11.

Figure 2:
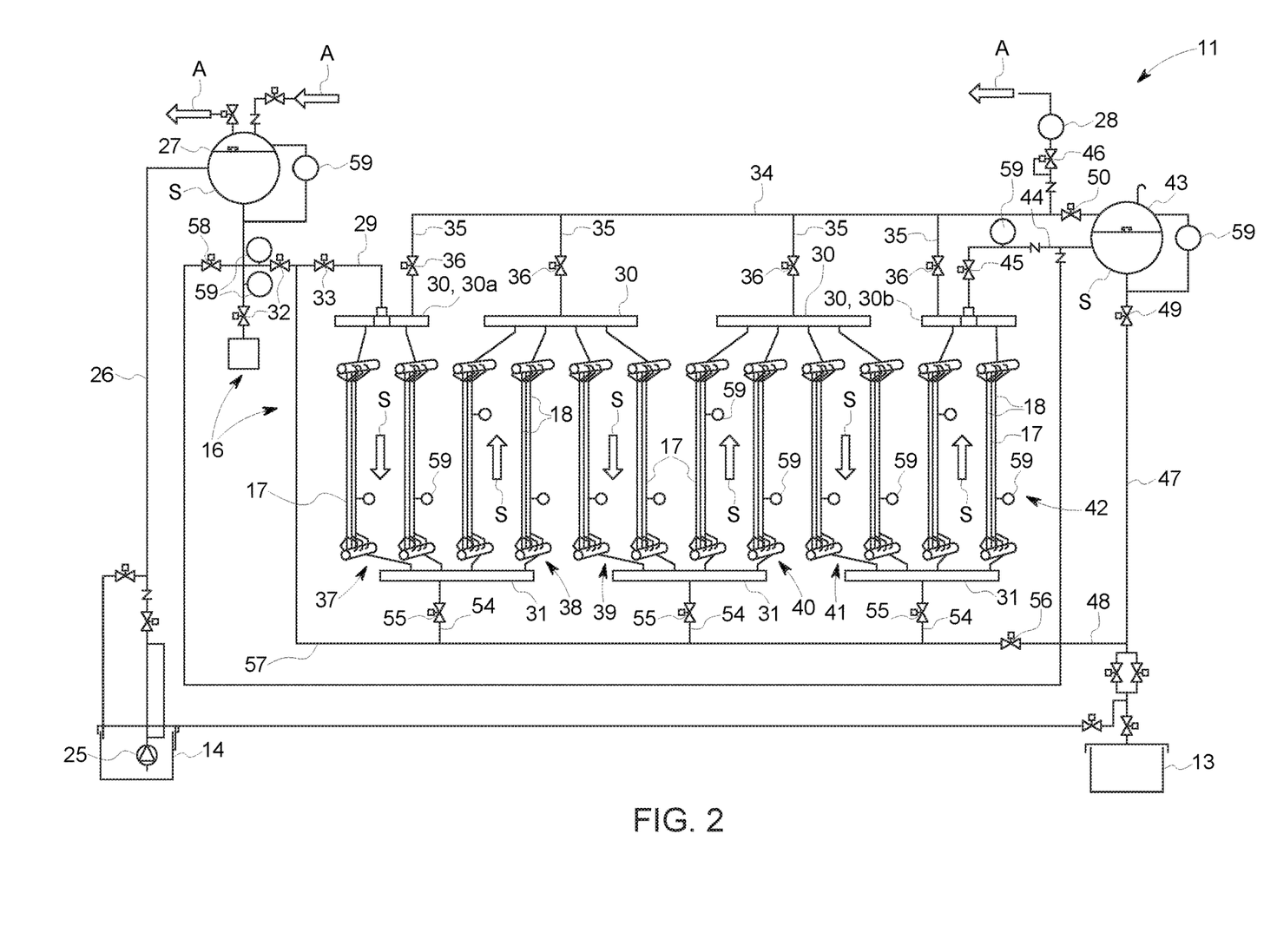
FIG. 2 is a block diagram of a molten salt central receiver arrangement of the molten salt solar thermal power plant of FIG. 1 in a normal operating condition.
Figure 3:
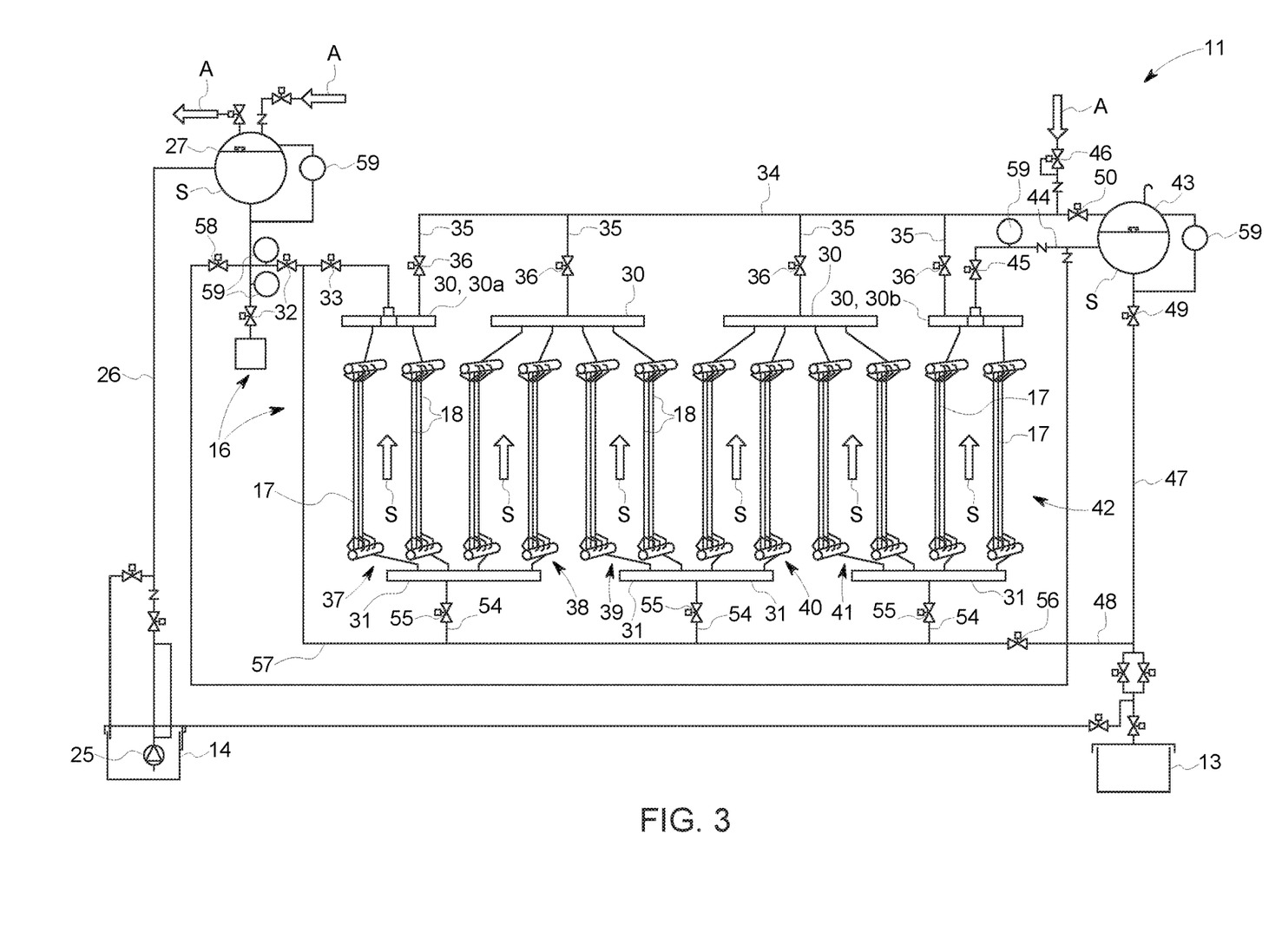
FIG. 3 is a block diagram of the molten salt central receiver arrangement of FIG. 2 in a parallel flow condition.
Figure 4:
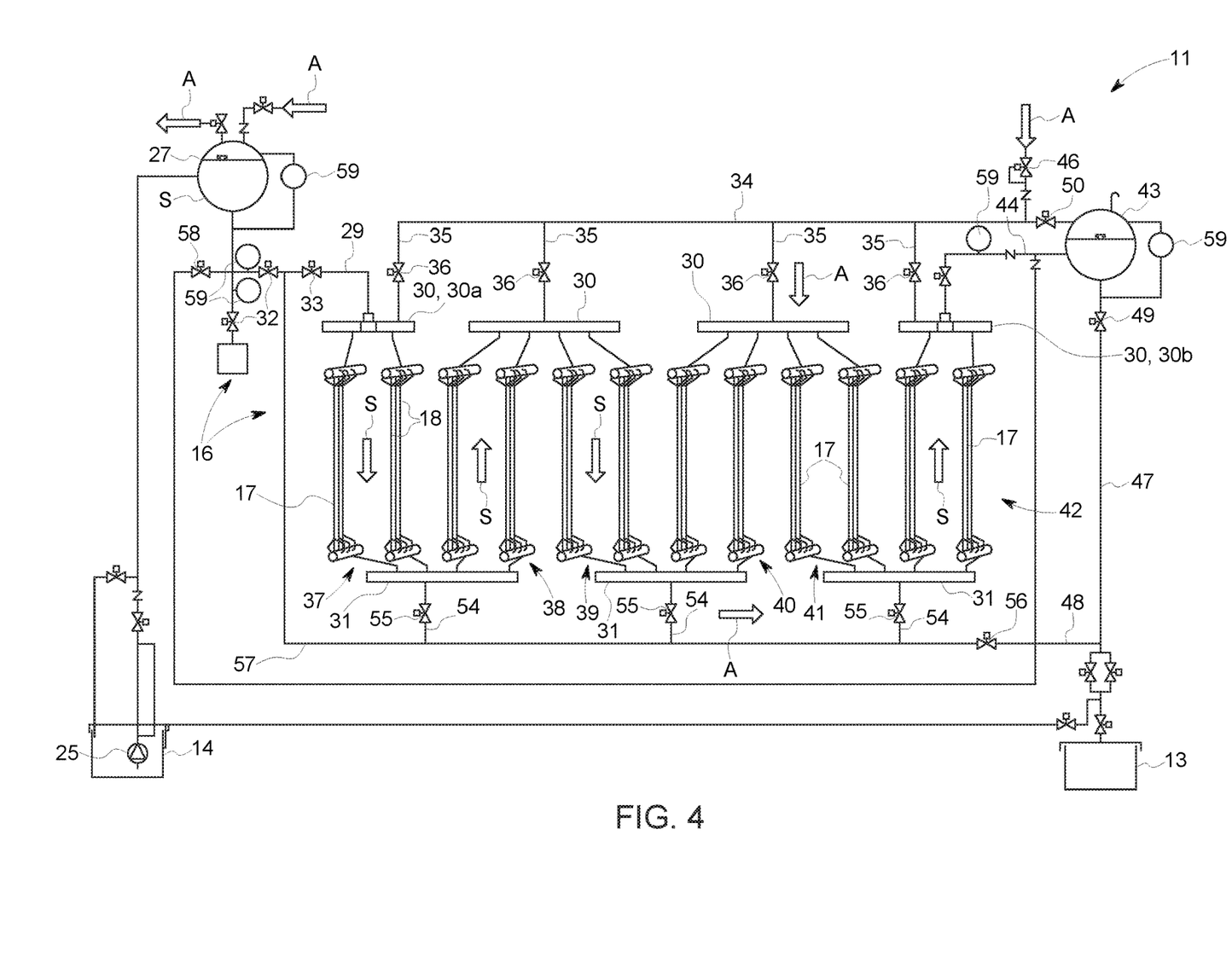
FIG. 4 is a block diagram of the molten salt central receiver arrangement of FIGS. 2 and 3 in a draining condition.

FIGS. 2 to 4 show an embodiment of the molten salt central receiver arrangement 11. A pump 25 is provided to deliver molten salt from the cold tank 14 via an inlet line 26 into an inlet tank 27. The inlet tank 27 is a pressure tank, i.e. the molten salt S contained in the inlet tank 27 is pressurized. In the present example the molten salt S is pressurized in the inlet tank 27 by using compressed air A provided by a source of compressed air 28. The pressure of the molten salt S in the inlet tank 27 is used to forward the molten salt S to and through the panels 17 of the panel arrangement 16.

A feed line 29 is connected to the inlet tank 27. The feed line 29 leads from the inlet tank 27 to the panel arrangement 16. It has to be noted that the molten salt central receiver arrangement 11 may comprise one or more panel arrangements 16, as schematically illustrated in FIGS. 2 to 4. Accordingly, the feed line 29 may be connected to one or more panel arrangements 16. The panel arrangements 16 can be controlled and operated independent and separate from each other. FIGS. 2 to 4 show only one panel arrangement 16 in detail for simplicity only.

Each panel 17 of a panel arrangement 16 is fluidically connected between an upper manifold 30 and a lower manifold 31. Preferably the tubes 18 of each panel 17 are arranged vertically. The feed line 29 is fluidically connected to a first upper manifold 30a of the upper manifolds 30. In the feed line 29 between the inlet tank 27 and the first upper manifold 30a a controllable first feed line valve 32 and a controllable second feed line valve 33 are disposed.

Each of the upper manifolds 30 is fluidically connected with a vent line 34 by means of a respective upper branch line 35. In each upper branch line 35 a controllable upper branch valve 36 is disposed.

The panels 17 of one panel arrangement 16 may be connected in a serial flow arrangement and thus may define several passes. The panels 17 of the first pass are connected with the first upper manifold 30a. The panels 17 of the first pass 37 and an adjacent second pass 38 are connected to one common lower manifold 31. The panels 17 of the second pass 38 and the panels 17 of a third pass 39 are connected to a common upper manifold 30. The panels of the third pass 39 and a fourth pass 40 are connected to one common lower manifold 31. The panels 17 of the fourth pass 40 and a fifth pass 41 are connected to one common upper manifold 30. Finally, the panels of the fifth pass 41 and a sixth pass 42 are connected to one common lower manifold 31. The sixth pass 42 is the last pass in the present embodiment and the panel 17 of the sixth pass 42 is connected to the last manifold, which is in this case a last upper manifold 30b. This means that the passes 37 to 42 can be connected in a serpentine manner in series between the first upper manifold 30a and the last upper manifold 30b. The last upper manifold 30b is fluidically connected with an outlet tank 43 by means of a supply line 44. A controllable supply line valve 45 is disposed in the supply line 44.

As illustrated in FIG. 2, the compressed air source 28 is fluidically connected or connectable with the vent line 34 via a controllable air valve 46. Between the connection of the source of compressed air 28 with the vent line 34 and the outlet tank 43 a vent line valve 50 may be disposed in the vent line 34.

The outlet tank 43 is fluidically connected with an outlet line 47 through which molten salt S of the outlet tank 43 may be delivered to the hot tank 13. A drain line 48 is connected with the outlet line 47. Between the connection of the outlet line 47 and the drain line 48 and the outlet tank 43 a controllable outlet valve 49 is disposed in the outlet line 47.

Each lower manifold 31 is fluidically connected with the drain line 48 by means of a lower branch line 54, in each of which a controllable lower branch valve 55 is disposed.

Between the connection of the drain line 48 and the outlet line 47 and the connection between the branch lines 54 and the drain line 48, a drain line valve 56 may be disposed in the drain line 48.

The drain line 48 is connected with the feed line 29 between the first and second feed line valve 32, 33.

Optionally a recirculation line may be present that fluidically connects the supply line 44 with the feed line 29. At the connection between the feed line 29 and the recirculation line 57 a controllable recirculation line valve 58 may be disposed in the recirculation line 57.

The molten salt central receiver arrangement 11 may contain several sensors or determination means for measuring or determining operating parameters, like temperatures and/or pressures and/or flow rates or the like. FIG. 2 shows multiple sensors 59 for measuring one or more of the mentioned operating parameters. Particularly a sensor 59 for measuring the panel temperature may be assigned to each of the panels 17. It should be noted that each sensor 59 may be adapted to measure one or more of the mentioned operating parameters.

Depending on at least the operating condition of one or more panels, particularly the panel temperature of the one or more panels 17, and/or additionally the environment signal E, the control device 12 is adapted to switch or bring one or more of the at least one panel arrangement 16 in a respective normal operating condition (FIG. 2), in a parallel flow condition (FIG. 3) or in a drain condition (FIG. 4). It has to noted that each of the panel arrangements 16 may be controlled independently of the one or more other panel arrangement(s).

During presence of solar radiation, if the molten salt S can be sufficiently heated, at least one panel arrangement 16 or all panel arrangements 16 are put in the normal operating condition, as shown in FIG. 2. Molten salt S flows from the inlet tank 27 through the feed line 29 into the first upper manifold 30a. Subsequently the molten salt S flows through the serial arrangement of passes 37 to 42 and finally flows into the last upper manifold 30b. The molten salt flows alternatingly downward an upward through the passes 37 to 42, i.e., the molten salt flows downward in the first pass 37, upward in the subsequent second pass 38, and so on. From the last upper manifold 30b the heated molten salt is forwarded to the hot tank 13 via the outlet tank 43. The inlet tank 27 and the outlet tank 43 can act as buffers.

If the control device 12 determines that the solar radiation and thus the available heat at the panel arrangement 16 is insufficient to heat the molten salt S, the control device 12 switches selectively to the parallel flow condition, as illustrated in FIG. 3 or to the drain condition, as illustrated in FIG. 4. Preferably, the control device 12 switches to the parallel flow condition, if it is determined or estimated that the period of time, during which the solar radiation and thus the available heat power is insufficient, does not exceed a predetermined time threshold. If it is determined or estimated that the period of time during which insufficient heat power is present exceeds the predetermined time threshold, the control device 12 switches preferably to the drain condition, as illustrated in FIG. 4.

During the parallel flow condition the lower branch valves 54 and the upper branch valves 36 are switched in the open or connecting state by means of the control device 12. The air valve 46 is maintained in a closed or blocking state. The drain line 48 is used to feed molten salt into the panels. To do so, the first feed line valve 32 is switched in the open or connecting state and the second feed line valve 33 is switched in the closed or blocking state. The drain line valve 56 is switched in the closed or blocking state. Thus, molten salt coming from the inlet tank 27 is forced through the pressure in the inlet tank 27 into the drain line 48 and further into the lower branch lines 54 and the lower manifolds 31. From the lower manifolds 31 the molten salt enters the panels 17, flows upward through the panels and into the respective upper manifolds 30. From the upper manifolds 30 the molten salt S flows through the upper branch lines 35 and via the vent line 34 into the outlet tank 43.

In this parallel flow condition the molten salt S flows in parallel through the panels 17 of the panel arrangement 16, i.e., only once through one of the passes 37 to 42. Thus, the residence time of the molten salt S in the panel arrangement 16 is short and the cooling of the molten salt S is limited. As a result, a temperature drop down to a critical temperature value of the molten salt S is avoided at least during a period of time. The parallel flow condition allows a fast re-start of the molten salt central receiver arrangement 11, because all of the panels 17 remain filled with molten salt. If sufficient solar radiation is available, the control device 12 can easily switch back to the normal operation, that was explained in connection with FIG. 2 above.

If it is determined or estimated that the duration of insufficient available heat at the molten salt central receiver arrangement 11 is longer than the time threshold, the control device 12 switches to the drain condition. In this drain condition, compressed air A enters at least one or more of the panels 17 and forces the molten salt out of the respective panel or panels 17. The control device 12 is adapted to drain one or more panels 17 or groups of panels 17 individually. According to the present example, it is possible to sequentially drain those groups of panels 17 that are connected to different upper manifolds 30. In the exemplary situation illustrated in FIG. 4, the fourth pass 40 and the fifth pass 41 are drained by opening the air valve 46 and the upper branch valve 36 in the branch line 35 that leads to the upper manifold 30 of the fourth and fifth pass 40, 41. The compressed air pushes the molten salt downward out of the respective panels 17 through the lower manifolds 31 and over the lower branch lines 54 into the drain line 48.

Panels 17 or groups of panels 17 can be drained in a determined order that at least depends on the operating condition of one of the panels 17 or groups of panels 17. In the present example the panel temperature is evaluated and those panels 17 or those groups of panels 17 are drained first that have the lowest panel temperature. In so doing, freezing of the molten salt can be effectively prevented. The panel 17 or the group of panels 17 having the highest panel temperature may be drained last. Preferably the panels 17 or groups of panels 17 are drained in an order corresponding to the panel temperature and starting with the panel 17 having the lowest panel temperature. Depending on that specific operating condition, the molten salt flow through panels 17, still having a sufficient temperature, may be maintained as long as possible to increase the efficiency of the molten salt central receiver arrangement 11. If the temperature of multiple panels 17 or all of the panels 17 is critical, it is also possible to drain multiple panels 17 or all of the panels 17 in parallel.

The present invention is directed to a molten salt central receiver arrangement 11 for transferring heat from panels 17 to a molten salt S that flows through the panels 17. A control device 12 is provided that allows to change the condition of at least one of the panel arrangements 16 of the molten salt central receiver arrangement 11 depending on at least an operating parameter of at least one panel 17 and/or depending on an environment signal that characterizes the actual or forecast available heat for the heat transfer to the molten salt. In normal operation passes 37 to 42, each having one or more panels 17, are connected in series such that molten salt flows in a serpentine or alternating way upward and downward through subsequent passes 37 to 42. In a parallel flow condition, molten salt may flow upward through all of the panels 17 in parallel. In a drain condition, the molten salt S is forced out of one or more panels 17 and replaced by compressed air. The panels 17 may be drained in an order depending on at least the operating condition and particularly the panel temperature of one or more panels 17.

The invention claimed is:

1. A molten salt central receiver arrangement comprising:
a panel arrangement having multiple panels, wherein each panel is fluidically connected between an upper manifold and a lower manifold,
an inlet tank for providing molten salt to the panel arrangement, that is fluidically connectable via a feed line with a first upper manifold,
an outlet tank for receiving molten salt from the panel arrangement, that is fluidically connectable with a last manifold of the upper and lower manifolds via a supply line,
a vent line fluidically connectable with the outlet tank, wherein each upper manifold is fluidically connectable via an upper branch line with the vent line, wherein a controllable upper branch valve is disposed in each upper branch line,
a compressed air source fluidically connectable with the vent line via a controllable air valve,
a drain line fluidically connectable with the feed line, wherein each lower manifold is fluidically connectable via a lower branch line with the drain line, wherein a controllable lower branch valve is disposed in each lower branch line,
a control device configured to control the upper and lower branch valves and the air valve depending at least on an operating condition of one or more panels,
wherein the control device is configured to:
selectively drain at least one of the panels individually or at least two of the panels in an order determined depending at least on the operating condition or an environment signal that characterizes a heating of the one or more panels by providing compressed air to the respective at least one upper manifold, and
create a parallel flow of molten salt from the lower manifolds through the one or more panels to the upper manifolds by controlling the upper branch valves and the lower branch valves depending on at least one of the operating condition or the environment signal.

2. The molten salt central receiver arrangement of claim 1, wherein the control device is configured to open the upper branch valves and the lower branch valves to create the parallel flow of molten salt from the lower manifolds, through the panels to the upper manifolds.

3. The molten salt central receiver arrangement of claim 1, wherein the control device is configured to drain the at least one of the panels by forcing the molten salt out of the at least one of the panels by means of the pressure of the compressed air.

4. The molten salt central receiver arrangement of claim 1, further comprising at least one temperature sensor configured to determine a panel temperature of at least one of the panels.

5. The molten salt central receiver arrangement of claim 4, wherein the control device is configured to drain at least one of the panels and/or to create the parallel flow of molten salt depending at least on the actual panel temperature.

6. The molten salt central receiver arrangement of claim 5, wherein the control device is configured to drain a panel with the lowest panel temperature first.

7. The molten salt central receiver arrangement of claim 5, wherein the control device is configured to drain a panel with the highest panel temperature last.

8. The molten salt central receiver arrangement of claim 5, wherein the control device is configured to drain the panels in the order of the panel temperatures beginning with a panel having the lowest panel temperature.

9. The molten salt central receiver arrangement of claim 1, wherein the environment signal is based on an operator input.

10. The molten salt central receiver arrangement of claim 1, wherein the environment signal is based on a determined and/or forecast weather condition.

11. The molten salt central receiver arrangement of claim 10, wherein the weather condition corresponds to a solar radiation.

12. The molten salt central receiver arrangement of claim 1, wherein the inlet tank is a pressure tank.

13. A method of operating a molten salt central receiver arrangement of claim 1, with the following steps:
   determining an operating condition of one or more panels,
   drain at least one of the panels individually or at least two of the panels in an order determined depending on the operating condition of the one or more panels, and/or create a parallel flow of molten salt from the lower manifolds through the panels to the upper manifolds.

14. A molten salt central receiver arrangement comprising:
   a molten salt central receiver comprising a panel arrangement having a plurality of panels;
   a control device configured to control the molten salt central receiver depending on at least one operating condition of the plurality of panels, the control device is configured to:
      selectively drain at least one of the plurality of panels individually or at least two of the plurality of panels in an order determined depending at least on the operating condition or an environment signal that characterizes a heating of the plurality of panels by providing compressed air to upper manifolds of the molten salt receiver; and
      create a parallel flow of molten salt from lower manifolds of the molten salt receiver through the plurality of panels to the upper manifolds by controlling upper and lower branch valves of the molten salt receiver depending on at least one of the operating condition or the environment signal.

* * * * *